United States Patent [19]

Yoshida et al.

[11] Patent Number: 4,737,905
[45] Date of Patent: Apr. 12, 1988

[54] APPARATUS EMPLOYING COORDINATE SYSTEM AND NONLINEAR TRANSFORMATIONS FOR MOVING A DRIVEN MEMBER IN RESPONSE TO AN OPERATING MEMBER

[75] Inventors: Masahito Yoshida, Kawasaki; Osamu Arai, Miura; Hiroko Tsuchida; Mieko Murayama, both of Yokohama, all of Japan

[73] Assignee: Nippon Kogaku K. K., Tokyo, Japan

[21] Appl. No.: 800,043

[22] Filed: Nov. 20, 1985

[30] Foreign Application Priority Data

Nov. 28, 1984 [JP] Japan .................................. 59-251258

[51] Int. Cl.$^4$ .............................................. G05B 19/18
[52] U.S. Cl. ..................................... 364/190; 364/167; 364/731
[58] Field of Search ............... 364/167, 190, 731, 815, 364/513, 474, 475; 318/628, 568; 340/709

[56] References Cited

U.S. PATENT DOCUMENTS

| | | | |
|---|---|---|---|
| 3,127,506 | 3/1964 | Fayard | 364/475 |
| 3,543,910 | 12/1970 | Devol et al. | 364/513 |
| 3,920,972 | 11/1975 | Corwin, Jr. et al. | 364/513 |
| 4,365,300 | 12/1982 | Johanson et al. | 364/474 |
| 4,381,608 | 5/1983 | Thormann et al. | 364/167 |
| 4,434,437 | 2/1984 | Sholle et al. | 364/731 |
| 4,481,601 | 11/1984 | Heinle | 364/815 |
| 4,511,985 | 4/1985 | Inaba | 318/568 X |
| 4,521,721 | 6/1985 | Kinoshita | 364/167 |
| 4,534,685 | 8/1985 | Komiya et al. | 364/474 |
| 4,543,635 | 9/1985 | Joe et al. | 364/731 |
| 4,577,141 | 3/1986 | Saiki et al. | 364/190 |
| 4,589,061 | 3/1986 | Nordström | 364/190 |

*Primary Examiner*—Jerry Smith
*Assistant Examiner*—John R. Lastova
*Attorney, Agent, or Firm*—Shapiro and Shapiro

[57] ABSTRACT

An apparatus for moving a driven member, such as a stage, in response to inclination of an operating member, such as a joy stick, produces signals that are transformed between different coordinate systems, such as rectangular and polar coordinate systems, one of the signal transformations being nonlinear. By virtue of the invention, the velocity of the driven member, which is dependent upon the inclination of the operating member, does not depend on the direction of inclination of the operating member, and the direction of movement of the driven member corresponds accurately to the direction of inclination of the operating member.

5 Claims, 6 Drawing Sheets

PRIOR ART

F I G. 2

PRIOR ART

F I G. 3

PRIOR ART

APPARATUS EMPLOYING COORDINATE SYSTEM AND NONLINEAR TRANSFORMATIONS FOR MOVING A DRIVEN MEMBER IN RESPONSE TO AN OPERATING MEMBER

BACKGROUND OF THE INVENTION

1. Field of the Invention

This invention relates to a driving apparatus for driving a driven member such as an XY stage in a measuring machine.

2. Description of the Prior Art

A joy stick having an operating lever capable of being inclined in any direction can put out electrical signals corresponding to an X direction component and a Y direction component corresponding to the direction of inclination of the operating lever from a neutral position. When the hand is released from the operating lever, the operating lever returns to the neutral position.

In an XY stage of a three-layer structure a Y direction driving apparatus may comprise for example, a motor and a Y direction lead screw provided on a reference member, and a Y direction stage provided for sliding movement on the reference member only in Y direction and having a frame threadably engaged with the Y direction lead screw. An X direction driving apparatus similar to the Y direction driving apparatus is provided on the Y direction stage, and the frame of an X direction stage is provided on the Y direction stage for sliding movement only in X direction and is threadably engaged with the X direction lead screw of the X direction driving apparatus. The motor of the X direction driving apparatus and the motor of the Y direction driving apparatus can be designed so as to be driven by electrical signals corresponding to the X direction component and the Y direction component which are obtained from the joy stick.

Apparatuses designed such that the control of the movement of the XY stage is accomplished by the operating lever of the joy stick in this manner are already commercially available.

Figure 1:
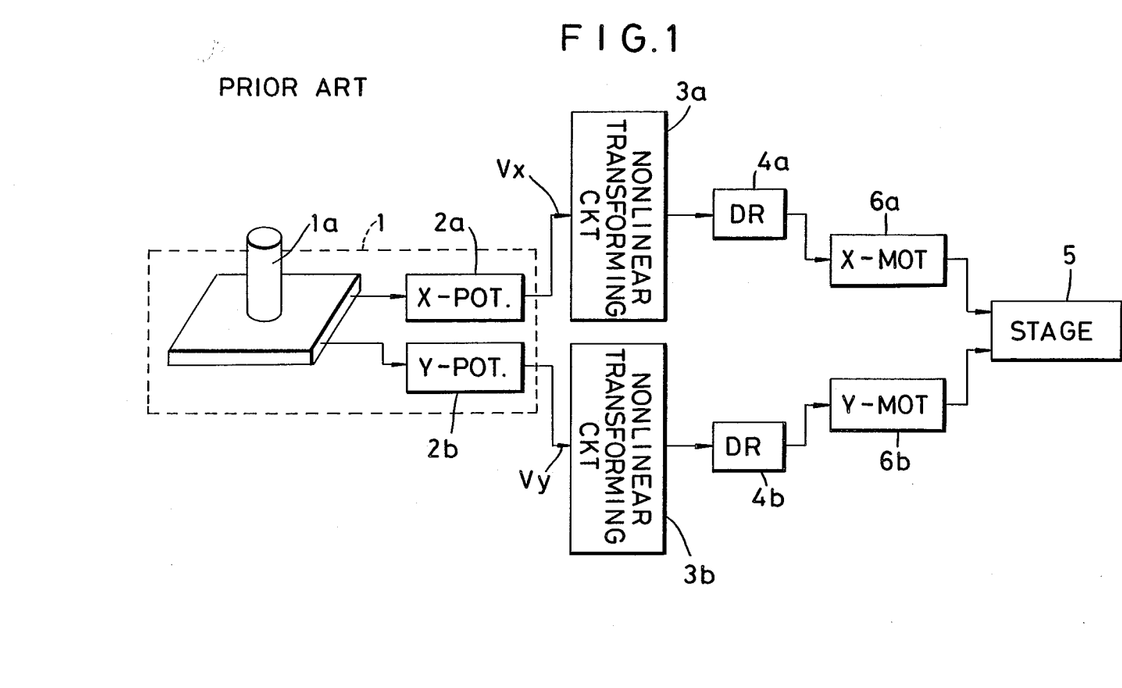
FIG. 1 is a block diagram of the prior art.

In an apparatus of this type, in order to execute a wide range of velocity commands, as shown in FIG. 1 of the accompanying drawings, there is provided a joy stick designed such that the division ratio of an X direction potentiometer 2a and a Y direction potentiometer 2b for dividing a reference voltage correspondingly to the direction of inclination and the angle of inclination of an operating lever 1a varies. A accordingly electrical signals indicative of the X direction component and the Y direction component which are put out from the respective potentiometers 2a and 2b (the former is an X signal Vx and the latter is a Y signal Vy) vary. The X signal Vx and the Y signal Vy are input to nonlinear transforming circuits 3a and 3b, respectively, and the output signals of the nonlinear transforming circuits 3a and 3b pass through motor driving circuits 4a and 4b and are applied to an X direction motor 6a and a Y direction motor 6b for moving an XY stage 5 in X and Y directions.

In such a conventional apparatus, however, the X signal Vx and the Y signal Vy have been non-linearly transformed directly correspondingly to the X and Y directions of the stage, and this has led to the following disadvantages:

(1) Generally, the angle of inclination of the joy stick from the neutral position of the operating lever and the velocity of movement of the stage do not primarily correspond to each other, and the velocity of movement of the stage depends on the direction of inclination of the joy stick in the xy coordinates system; and (2) Generally, the direction of inclination of the operating lever of the joy stick (which corresponds to the azimuth angle or the declination in the polar coordinates) and the direction of movement of the stage do not coincide with each other.

This will hereinafter be described in detail with respect to a two-dimensional example.

If the angles of inclination of the operating lever in X and Y directions are $\theta x$ and $\theta y$, there is the following relation between the X signal (voltage) Vx from the potentiometer 2a and the Y signal Vy from the potentiometer 2b:

$$Vx = a\theta x, \quad Vy = a\theta y \tag{1}$$

where a is a suitable constant.

Here, let it be assumed that in a three-dimensional rectangular coordinates system comprising x, y and z axes, when the operating lever is in its neutral position, the operating lever is coincident with the z axis and the center of inclination of the joy stick is coincident with the origin of the coordinates. Then, $\theta x$ is the angle formed between the image of the operating lever projected onto the xz plane and the z axis, and $\theta y$ is the angle formed between the image of the operating lever projected onto the yz plane and the z axis.

Also, when the angle of inclination of the joy stick is displayed in polar coordinates and use is made of the absolute value $|\theta|$ of the angle of inclination and the azimuth angle $\phi$, $\theta x$ and $\theta y$ are expressed by tan $\theta x = \tan \theta \cdot \cos \phi$ and tan $\theta y = \tan \theta \cdot \sin \phi$, but when $\theta$ is small, $\theta x$ and $\theta y$ are approximately expressed as follows:

$$\theta x \neq |\theta| \cos \phi, \quad \theta y \neq |\theta| \sin \phi \tag{2}$$

If it is assumed that a cubic function is used as an example of the nonlinear characteristic, outputs V'x and V'y nonlinearly transformed with the voltage outputs Vx and Vy being received are expressed by the use of a constant p, $$\left. \begin{array}{l} V'x = p \cdot V^3x = a^3 \cdot p \cdot \theta^3 x \\ V'y = p \cdot V^3y = a^3 \cdot p \cdot \theta^3 y \end{array} \right\} \tag{3}$$

The motor driving circuits 4a and 4b receive these voltages V'x and V'y and effect control so that the stage is moved at velocities proportional thereto. That is, if it is assumed that by the use of a suitable constant q, the velocities $v_x$ and $v_y$ of the stage in x and y directions are given by $$\left. \begin{array}{l} v_x = q \cdot V'x = p \cdot q \cdot V^3x = a^3 \cdot p \cdot q \cdot \theta^3 x \\ v_y = q \cdot V'y = p \cdot q \cdot V^3y = a^3 \cdot p \cdot q \cdot \theta^3 y \end{array} \right\} \tag{4}$$

then the movement velocity components $v_x$ and $v_y$ of the stage are displayed in polar coordinates with the absolute value $|v|$ of the velocity and the direction of movement $\phi v$ being expressed as follows:

$$|v| = \sqrt{v^2x + v^2y} = a^3 \cdot p \cdot q \sqrt{\theta^6 x + \theta^6 y} \quad (5)$$

$$= a^3 \cdot p \cdot q |\theta^3| \sqrt{1 - \frac{3}{8}(1 - \cos 4\phi)}$$

$$\phi v = \cos^{-1}\frac{v_x}{|v|} = \cos^{-1}\frac{a^3 \cdot p \cdot q \cdot \theta^3 x}{a^3 \cdot p \cdot q \sqrt{\theta^6 x + \theta^6 y}} \quad (6)$$

$$= \cos^{-1}\frac{\cos^3\phi}{\sqrt{3\cos^4\phi - 3\cos^2\phi + 1}}$$

Further, if the direction of movement $\phi v$ of the stage is differentiated by the direction of inclination $\phi$ of the operating lever, there is obtained:

$$\frac{d\phi v}{d\phi} = \frac{d}{d\phi}\left(\cos^{-1}\frac{\cos^3\phi}{\sqrt{\cos^6\phi + \sin^6\phi}}\right) \quad (7)$$

$$= \frac{3(1 - \cos 4\phi)}{5 + 3\cos^4\phi}$$

Figure 2:
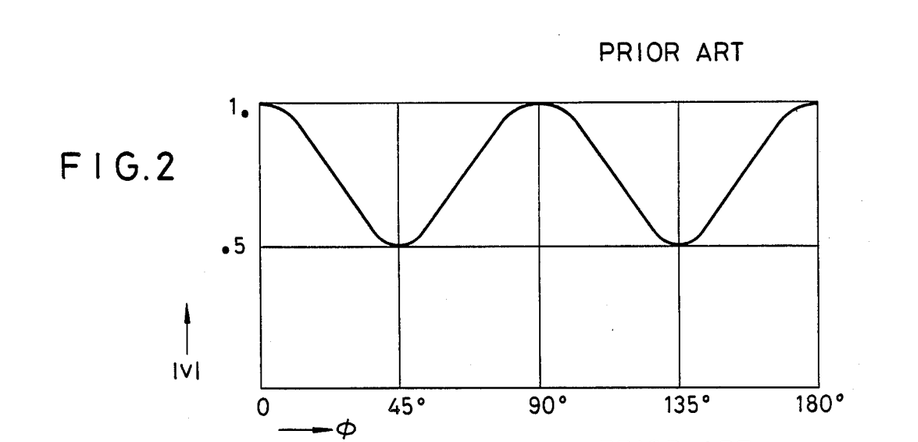
FIGS. 2, 3 and 4 are graphs showing parameters relating to operation of a joy stick in the prior art.

From equation (5), it is seen that the movement velocity $|v|$ of the stage not only primarily corresponds only to the angle of inclination $|\theta|$ of the operating lever but also corresponds to $\phi$ in the radical sign, i.e., the direction of inclination of the operating lever. This is shown in FIG. 2 of the accompanying drawings. It is seen that, as shown in FIG. 2, $|v|$ should be constant irrespective of the value of the direction of inclination $\phi$, but actually a maximum double fluctuation occurs with a variation in $\phi$.

Figure 3:
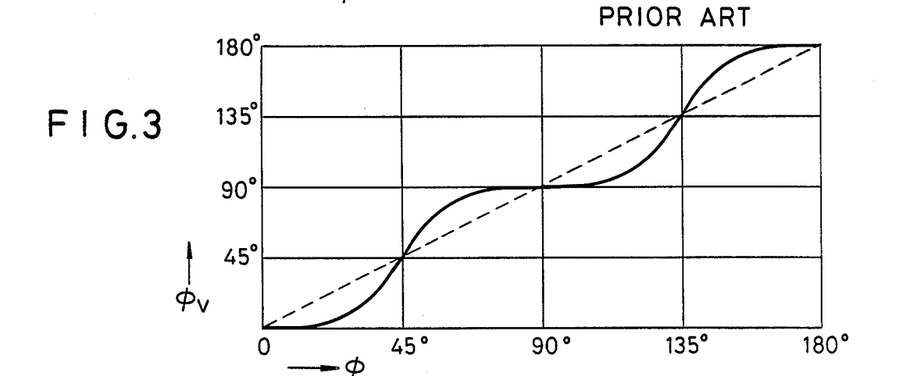
Figure 4:
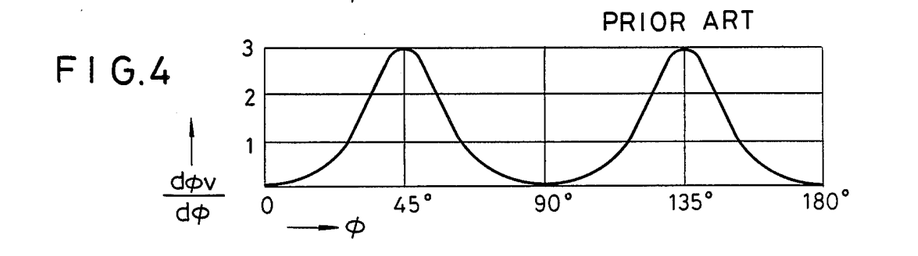

Also, from equation (6), it is seen that the direction of movement $\phi v$ of the stage should ideally coincide with the direction of inclination $\phi$ of the operating lever, but actually the two do not coincide with each other. This is shown in FIG. 3 of the accompanying drawings. It is only when the angle of inclination is 0°, 45°, 90°, ... that the two coincide with each other, and when $0° \leq \phi < 45°$, the direction of movement of the stage is transformed to the 0° side, and when $45° < \phi \leq 90°$, the direction of movement of the stage is transformed to the side approximate to 90°. Therefore, when the direction of movement of the stage is to be controlled by the joy stick, the operating lever must not be inclined in a direction coincident with a desired direction of movement, but must be inclined in a direction usually approximate to 45°. Equation (7) is one in which this direction of movement of the stage is differentiated by the direction of inclination of the operating lever and, as shown in FIG. 4 of the accompanying drawings, the differential coefficient should ideally be fixed to 1, but actually it exhibits a fluctuation O in the vicinity of the direction of inclination of 0° or 90° and exhibits a great fluction 3 in the vicinity of the direction of inclination of 45°. That is, even if the direction of inclination of the operating lever is delicately changed in the vicinity of the direction of inclination of 0° or 90°, the direction of movement of the stage will hardly change, and if conversely the operating lever is inclined in the vicinity of the direction of 45°, a slight deviation of the direction will greatly affect the direction of movement.

From the foregoing consideration, it is apparent that sufficient accuracy of operation cannot be obtained in the nonlinear transforming system as shown in FIG. 1 and the operator is forced to bear an inordinate burden.

In the foregoing consideration, a cubic function has been used as the nonlinear function, but it will be readily understood that a qualitatively similar characteristic is exhibited even when use is made of a different nonlinear function.

SUMMARY OF THE INVENTION

It is an object of the present invention to provide a driving apparatus, e.g., of a measuring machine, which is designed such that the velocity of a driven member, such as a stage depends upon the inclination of an operating member, e.g., of a joy stick, but does not depend on the direction of inclination of the operating member, and such that the direction of movement of the driven member is coincident with the direction of inclination of the operating member.

DESCRIPTION OF THE PREFERRED EMBODIMENTS

The present invention will hereinafter be described with respect to some embodiments thereof shown in the drawings.

Figure 5:
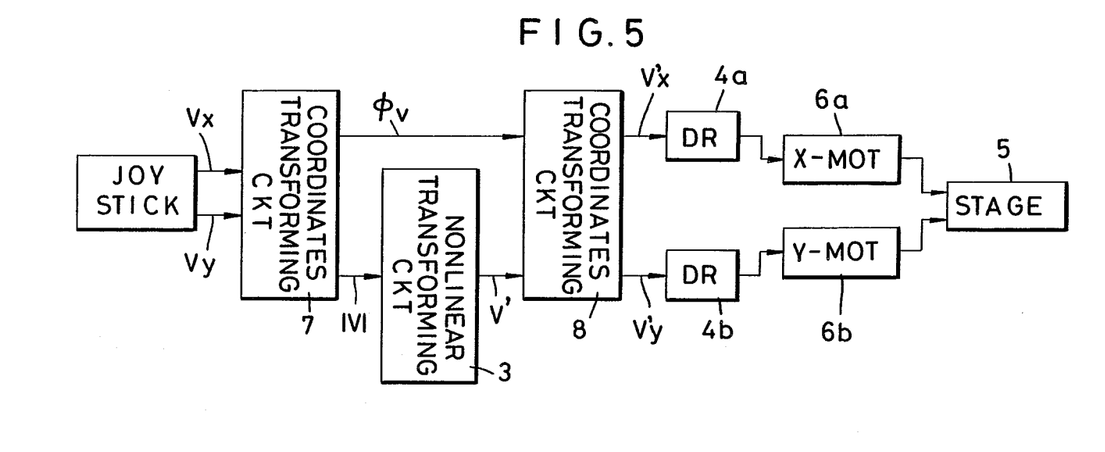
FIG. 5 is a block diagram of a first embodiment of the present invention.

FIG. 5 is a block diagram of a first embodiment of the present invention. An X signal Vx and a Y signal Vy corresponding to the direction of inclination and the angle of inclination of an operating lever 1a which are put out from a joy stick 1 similar to the conventional joy stick shown in FIG. 1 are transformed into polar coordinates signals, i.e., an azimuth angle signal $\phi v$ corresponding to the direction of inclination of the operating lever 1a and an absolute value signal $|V|$ corresponding to the angle of inclination of the operating lever 1a, by a coordinates transforming circuit 7 for transforming signals from a rectangular coordinates system into a polar coordinates system. It is to be understood that $\theta x$ and $\theta y$ correspond to x coordinates and y coordinates, respectively. The absolute value signal $|V|$ is input to a nonlinear transforming circuit 3 and is made, for example, a cubed transformation signal V'. The azimuth angle signal $\phi v$ and the transformation signal V' are transformed into signals V'x and V'y by a coordinates transforming circuit 8 for transforming signals from a polar coordinates system into a rectangular coordinates system. An x signal V'x is input to a motor driving circuit 4a and used to drive the X direction motor 6a of a stage 5, and a y signal V'y is input to a motor driving circuit 4b and used to drive the Y direction motor 6b of the stage 5.

As described above, the nonlinear transforming circuit 3 applies nonlinear transformation only to the absolute value signal |V| of the polar coordinates signals transformed by the coordinates transforming circuit 7 and does not vary the azimuth angle signal $\phi_V$ corresponding to the direction of inclination of the operating lever 1a and therefore, as regards the stage 5 driven by the signals V'x and V'y transformed by the coordinates transforming circuit 8, the direction of movement thereof is coincident with the direction of inclination of the operating lever 1a and the velocity of movement thereof varies depending on the angle of inclination of the operating lever 1a and the transformation content of the nonlinear transforming circuit 3.

A second embodiment of the present invention will now be described with reference to FIG. 6. The second embodiment differs from the first embodiment shown in FIG. 5 in that the transforming operation of the first embodiment is effected by a microcomputer (hereinafter referred to as the MC) 10.

The X signal Vx and the Y signal Vy put out from the joy stick 1 are converted into digital signals by A-D converters 9a and 9b, whereafter the digital signals are input to the MC 10. The MC 10 operates in accordance with the flow chart of FIG. 7 and puts out an X signal $V'_{DX}$ and a Y signal $V'_{DY}$ in accordance with the direction of inclination of the operating lever 1a. The X signal $V'_{DX}$ and the Y signal $V'_{DY}$ are converted into analog signals V'x and Y'y by D-A converters 11a and 11b, and these analog signals are input to motor driving circuits 4a and 4b. The output signals of the motor driving circuits 4a and 4b are input to the motors 6a and 6b of the stage 5 and thus, the stage 5 is moved in the direction of inclination of an operating lever 1a at a velocity which is in a predetermined relation with the angle of inclination of the operating lever.

The operation of the MC 10 will now be described in detail with reference to the flow chart of FIG. 7. The MC 10 first reads the A-D-converted value $V_{DX}$ of the X signal Vx and the A-D-converted value $V_{DY}$ of the Y signal Vy (step 30). Subsequently, on the basis of the thus read values, the MC 10 finds a value $\overline{V}$ (corresponding to the aforementioned absolute value signal |V|) corresponding to the angle of inclination of the operating lever 1a as $$\overline{V} = \sqrt{V_{DX}^2 + V_{DY}^2}$$

and also operates a value $\phi$ (corresponding to the aforementioned azimuth angle signal $\phi_V$) corresponding to the direction of inclination of the operating lever 1a as $$\phi = \cos^{-1}(V_{DX}/\overline{V}) \quad \text{(step 31)}$$

Then, at step 32, the MC 10 effects an operation $$V = b \cdot \overline{V}$$

and nonlinearly transforms a signal corresponding to the azimuth angle (in the present embodiment, transforms the signal into a cubic expression). It should be noted that b is a constant. At step 33, the MC 10 effects operations $$V'_{DX} = V \cdot \cos \phi$$

$$V'_{DY} = V \cdot \sin \phi$$

and transforms the signal of the polar coordinate system into the signal of the rectangular coordinates system.

At step 33, the MC 10 puts out the value $V'_{DX}$ as a new X signal to the D-A converter 11a and puts out the value $V'_{DY}$ as a new Y signal to the D-A converter 11b.

Figure 6:
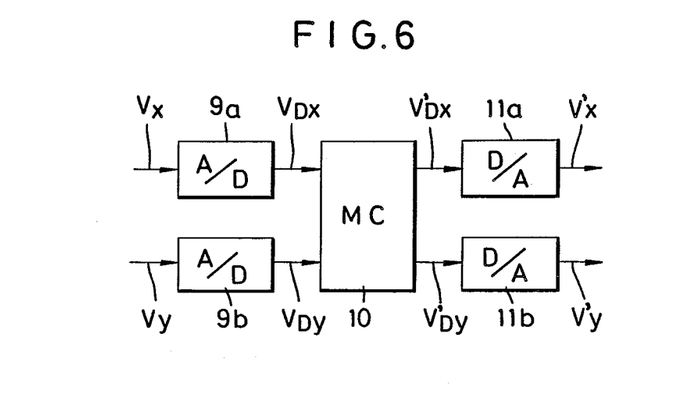
FIG. 6 is a block diagram of a second embodiment of the present invention.

By such a construction, according to the second embodiment of FIG. 6, as in the first embodiment of FIG. 5, the stage 5 can be moved in the direction of inclination of the operating lever 1a at a velocity which is in a predetermined relation with the angle of inclination of the operating lever.

The steps 31 to 33 in the microcomputer of the second embodiment can be coordinated as follows. That is, operations $$V'_{DX} = b \cdot (V_{DX}^2 + V_{DY}^2) \cdot V_{DX} \quad (8)$$

$$V'_{DY} = b \cdot (V_{DX}^2 + V_{DY}^2) \cdot V_{DY} \quad (9)$$

may be effected.

Figure 7:
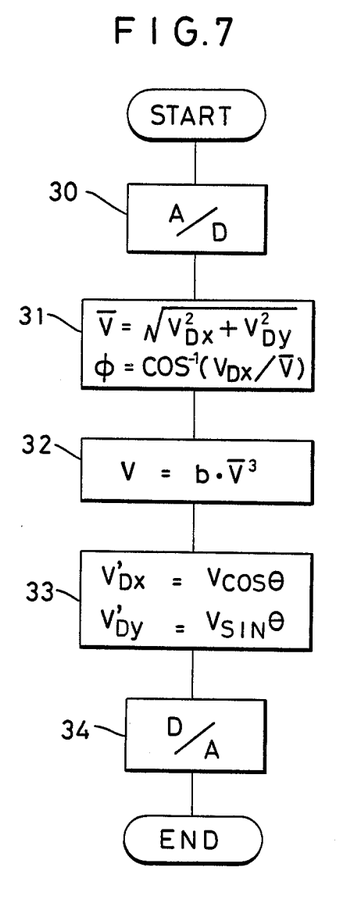
FIG. 7 is a flow chart illustrating the operation of a microcomputer used in FIG. 6.

Accordingly, if instead of steps 31, 32 and 33, a step at which the above-mentioned operations are effected is provided between step 30 and step 34, a function entirely similar to the flow chart of FIG. 7 can be performed.

Figure 8:
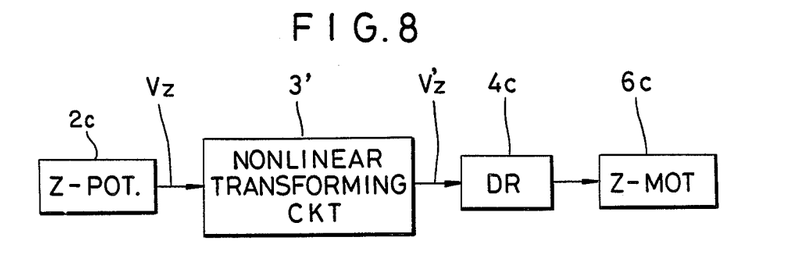
FIG. 8 is a block diagram of a third embodiment of the present invention.

In a third embodiment shown in FIG. 8, a member capable of putting out a three-dimensional signal is used as the joy stick. Such a joy stick, as shown in Japanese Laid-open Utility Model Application No. 131108/1984, is designed such that the grip portion of the operating lever expands and contracts axially thereof, and obtains a Z signal by the position of the grip portion. An X signal Vx, a Y signal Vy and a Z signal Vz are a put out from potentiometers 2a, 2b (see FIG. 1) and 2c. The X signal Vx and the Y signal Vy, as in the first embodiment, are transformed into an azimuth angle signal $\phi_V$, which is a polar coordinates signal, and an absolute value signal |V| by the coordinates transforming circuit 7, and only the absolute value signal |V| is nonlinearly transformed into a transformation signal V' by the nonlinear transforming circuit 3. As in the first embodiment, the coordinates transforming circuit 8 also transforms the azimuth angle signal $\phi_V$ and the transformation signal V' into signals of a rectangular coordinates system and puts out the signals V'x and V'y of the rectangular coordinates system. However, the Z signal Vz is independently subjected to nonlinear transformation by the nonlinear transforming circuit 3' (FIG. 8) and made into a Z signal V'z. These signals V'x, V'y and V'z are input to motor driving circuits 4a, 4b and 4c, respectively, and are used to drive the motors 6a, 6b and 6c, respectively, of a three-dimensionally driven stage 5. Again, the motor 6c moves the stage 5 in the Z direction.

Accordingly, if the operating lever is inclined at a certain angle in a certain direction, as in the first embodiment and the second embodiment, the stage 5 will be moved in the X-Y plane in the direction of inclination at a velocity which is in a predetermined relation with the angle of inclination. On the other hand, if the operating lever is expanded and contracted, the stage 5 will be moved in the Z direction (generally vertically) at a velocity corresponding to the amount of expansion and contraction.

There may be provided a joy stick putting out only the x signal and the y signal and another joy stick movable only in one exclusive direction regarding the z signal.

Figure 9:
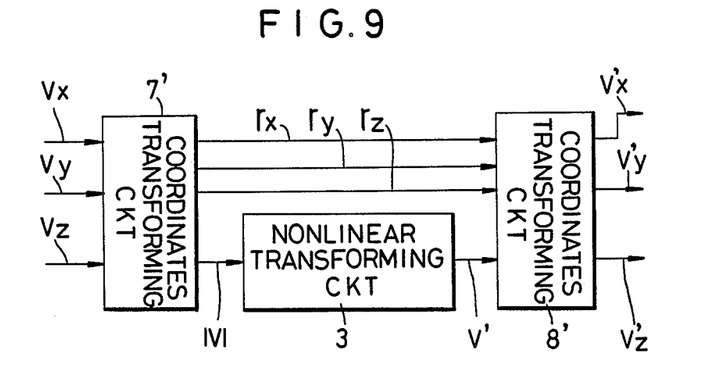
FIG. 9 is a block diagram of a fourth embodiment of the present invention.

FIG. 9 shows a fourth embodiment of the present invention. The construction of the joy stick 1 in this embodiment is the same as that in the third embodiment of FIG. 8. Signals Vx, Vy and Vz are transformed into polar coordinates signals by a coordinates transforming circuit 7' for transforming signals from a rectangular coordinates system into a polar coordinates system, and an absolute value signal |V| and three direction cosine signals $r_x$, $r_y$ and $r_z$ are put out. The absolute value signal |V| put out from the coordinates tranforming circuit 7' is subjected to nonlinear transformation by a non-linear transforming circuit 3, whereafter with the direction cosine signals $r_x$, $r_y$ and $r_z$, it is transformed into signals V'x, V'y and V'z of the rectangular coordinates system by a coordinates transforming circuit 8' for transforming signals from the polar coordinates system into the rectangular coordinates system, and the signals V'x, V'y and V'z are input to motor driving circuits 4a, 4b and 4c, respectively. The motor driving circuits 4a, 4b and 4c are connected to the motors 6a, 6b and 6c, respectively, of the stage 5 and can therefore move the stage 5 three-dimensionally in desired directions at a desired velocity.

The coordinates transforming circuit 7, 7', the nonlinear transforming circuit 3, 3' and the coordinates transforming circuit 8, 8' in the third and fourth embodiments can be replaced by an A-D converter, a microcomputer and a D-A converter, respectively. This is shown as a fifth embodiment in FIG. 10.

Figure 10:
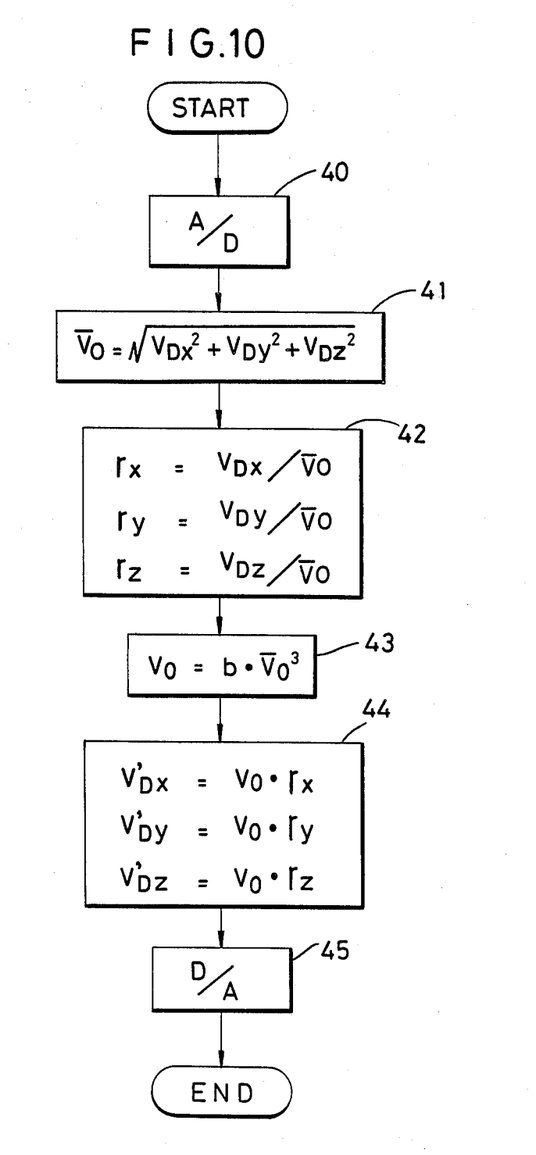
FIG. 10 is a flow chart illustrating the operation of a fifth embodiment of the present invention.

At step 40, the signals Vx, Vy and Vz shown in FIG. 9 are converted into digital signals $V_{DX}$, $V_{DY}$ and $V_{DZ}$, respectively, and at step 41, the microcomputer effects an operation $$\overline{V_0} = \sqrt{V_{DX}^2 + V_{DY}^2 + V_{DZ}^2},$$

where $\overline{V}$ corresponds to |V| in the fourth embodiment. At step 42, operations $$r_x = V_{DX}/\overline{V_0}$$
$$r_y = V_{DY}/\overline{V_0}$$
$$r_z = V_{DZ}/\overline{V_0}$$

are effected. At step 43, a nonlinear transformation as indicated by the following equation is effected.

$$V_0 = b \cdot \overline{V_0}^3.$$

At step 44, operations $$V'_{DX} = V_0 \cdot r_x$$
$$V'_{DY} = V_0 \cdot r_y$$
$$V'_{DZ} = V_0 \cdot r_z$$

are effected, and at step 45, $V'_{DX}$, $V'_{DY}$ and $V'_{DZ}$ are converted into analog signals $V'_x$, $V'_y$ and $V'_z$ respectively.

As the driven member, the probe, robot or the like of a three-dimensional coordinates measuring machine may be used besides the stage 5.

Also, the nonlinear transformation is not restricted to a cubic function, but may use any nonlinear function as desired. Even if the nonlinear transformation basically follows a cubic function, a predetermined insensitive zone may be provided near the neutral position of the joy stick, or the joy stick may be endowed with a saturation characteristic for which it puts out a predetermined combined velocity in the vicinity of a maximum angle of inclination. Further, as regards the basic function, the use of a higher-order function or the use of a modified exponential function is allowable without any contradiction to the gist of the present invention.

Also, the joy stick in the embodiments of the present invention is designed to produce signals corresponding to the rectangular coordinates system, whereas the present invention is equally effective for a joy stick which produces signals corresponding to the polar coordinates system.

What we claim is:

1. An apparatus for moving a driven member in response to the inclination of an operating member from a neutral position, including:
    (a) means responsive to the inclination of said operating member for producing a first pair of rectangular coordinate signals indicative of two coordinates of a point in a rectangular coordinate system that depend upon the inclination of said operating member from said neutral position;
    (b) first transforming means for transforming said first pair of rectangular coordinate signals into polar coordinate signals indicative of coordinates in a polar coordinate system, said polar coordinate signals including an absolute value signal dependent upon an angle of inclination of the operating member and an azimuth angle signal dependent upon a direction of inclination of the operating member;
    (c) second transforming means for transforming said absolute value signal on the basis of a predetermined nonlinear function;
    (d) third transforming means for transforming the transformed absolute value signal and said azimuth angle signal into a second pair of rectangular coordinates signals; and
    (e) moving means including a pair of driving means which move said driven member along two rectangular coordinate axes at speeds dependent upon said second pair of rectangular coordinate signals, respectively.

2. An apparatus according to claim 1, wherein said predetermined nonlinear function is approximately equal to a cubic function.

3. An apparatus according to claim 1, wherein said apparatus further comprises means for producing a further rectangular coordinate signal indicative of a third coordinate of said point in said rectangular coordinate systems, and wherein said moving means includes means for driving said driven member along a third rectangular coordinate axis at a speed dependent upon said further signal.

4. An apparatus according to claim 1, wherein each of said first and second pairs of rectangular coordinate signals is indicative of coordinates of a three-dimensional rectangular coordinate system.

5. An apparatus for moving a driven member in response to the inclination of an operating member from a neutral position, including:
    (a) means responsive to the inclination of said operating member for producing polar coordinate signals indicative of coordinates in a polar coordinate system, said polar coordinate signals including an absolute value signal and an azimuth angle signal, said absolute value signal depending upon an angle of inclination of said operating member and said azimuth angle signal depending upon a direction of inclination of said operating member;

(b) first transforming means for transforming said absolute value signal on the basis of a predetermined nonlinear function;

(c) second transforming means for transforming the transformed absolute value signal and said azimuth angle signal into a pair of rectangular coordinate signals indicative of two coordinates of a point in a rectangular coordinate system that are dependent upon the inclination of the operating member from said neutral position; and (d) moving means including a pair of driving means which move said driven member along two rectangular coordinate axes at speeds dependent upon said pair of rectangular coordinate signals, respectively.

* * * * *